Nov. 22, 1932.   S. J. RAETZ   1,888,806

LOCOMOTIVE ASH HOPPER MECHANISM

Filed Feb. 11, 1929

INVENTOR
Stephen J. Raetz
By Rodney Bedell
ATTORNEY

Patented Nov. 22, 1932

1,888,806

UNITED STATES PATENT OFFICE

STEPHEN J. RAETZ, OF LOWELL, MASSACHUSETTS

LOCOMOTIVE ASH HOPPER MECHANISM

Application filed February 11, 1929. Serial No. 339,148.

My invention relates to railway rolling stock and consists in a novel ash pan hopper door operating mechanism and the association therewith of the adjacent parts of a locomotive.

The main object of my invention is to provide an operating mechanism which can be utilized conveniently with a hopper mounted adjacent to a trailer truck frame and irrespective of variations in the location of the truck frame transversely of the track due to the curvature of the track.

An additional object of my invention is to provide a mechanism which will accommodate location of the hopper and its discharge door in close proximity to a booster motor mounted on a trailer truck axle.

Another object of my invention is to provide a simple and efficient locking arrangement for holding the door either in closed or in open position.

In the accompanying drawing which illustrates a selected embodiment of my invention—

Figure 1:
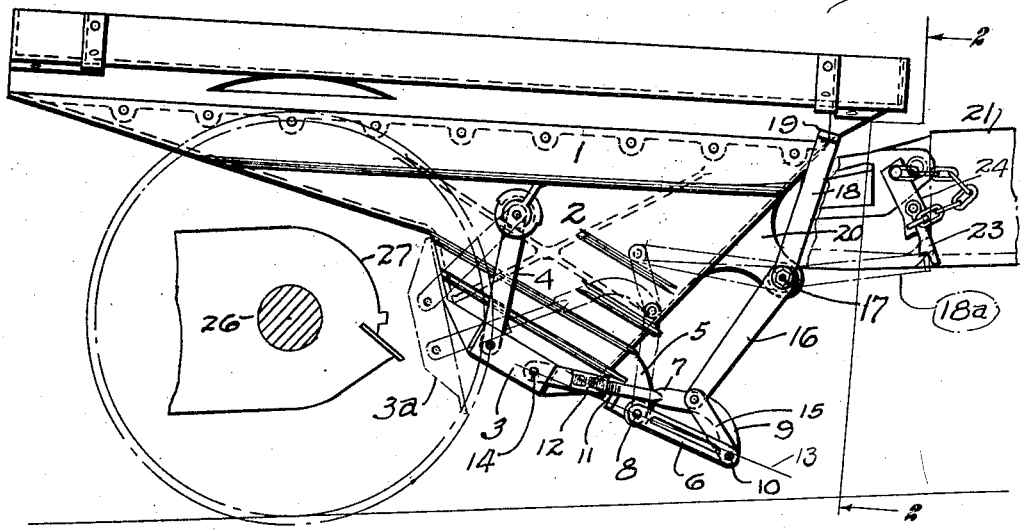
Figure 1 is a side elevation of an ash pan hopper with door closing mechanism and indicating the adjacent main frame or cradle of the locomotive and trailer truck with booster motor mounted on the axle thereof.
Figure 2:
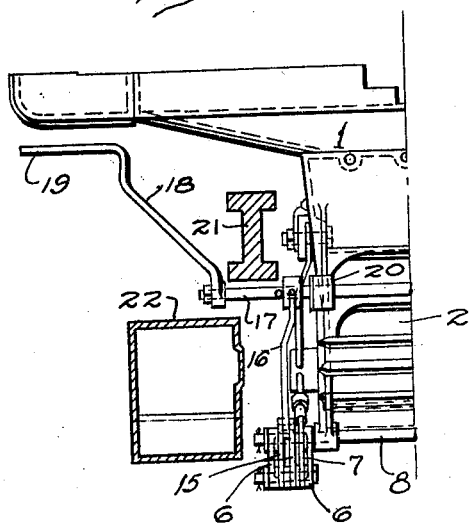
Figure 2 is a half front view of the same structure.
Figure 3:
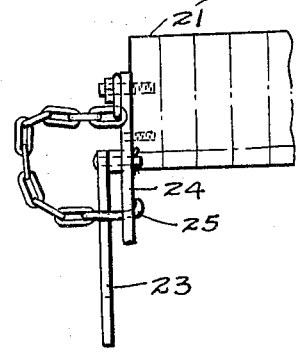
Figure 3 is a top view of a detail of the operating mechanism lock device.

The body of the ash pan is indicated at 1 and the hopper 2 depending therefrom is provided with an inclined discharge opening at its lower end. An inclined door 3 is hinged to the hopper by hangers 4 on opposite sides of the hopper. By means of these hangers, the door may swing from the full line position indicated in Figure 1 to the broken line position indicated at 3ª.

A bracket 5 on hopper 2 journals a shaft 8 which mounts a toggle arm 6 which extends outwardly from the hopper. Another toggle arm 7 is pivotally mounted at 14 on door 3 above the lower end of the door and extends outwardly from the hopper over the shaft 8 and then is curved downwardly as indicated at 9 and is pivotally connected at 10 to the outer end of arm 6. Preferably, arm 7 is made adjustable as indicated by the use of a threaded portion 11 fitted into a socket portion 12.

With the parts in the door closing position, the pivotal connection 10 will be just below a straight line 13 extending through the points 8 and 14. The arms 6 and 7 thereby form a toggle for holding the door in closed position.

The toggle arms are operated in both directions by a link 15 attached to the pivotal connection 10 and mounted on a lever 16 secured to an operating shaft 17 which is preferably provided with an operating crank 18 having a handle 19.

Operating shaft 17 is mounted on a bracket 20 located on the top of the hopper whereby shaft 17 can extend outwardly of the hopper just below the main frame, or cradle extension of the main frame, 21 and above the adjacent portion of the truck side frame 22. The operating member 18—19 extends upwardly from shaft 17 when the door is in closed position and, even when depressed to open the door, as indicated at 18ª, the handle does not extend into contact with the truck frame 22. Hence, the position of the truck frame laterally of the ash pan is immaterial so far as the operation of the hopper door mechanism is concerned.

I provide a locking device for holding the mechanism with the door in open position and this device comprises a pawl 23 pivotally mounted on a bracket 24 or other fixed element on the main frame or cradle 21. This pawl may be moved into engagement with the handle 19, as shown in Figure 1, and it may be secured in such position by use of the hook 25 which may be inserted through a hole in bracket 24. When the door is closed, the weight of the parts and the inertia of the toggle structure will hold the mechanism in door closing position and it is unnecessary to lock the shaft operating member 18—19 in its raised position.

The arrangement described facilitates the operation of the door and also permits the hopper and hopper door to be located near the trailer truck axle 26 and the front end 27 of a booster motor mounted on axle 26 and projecting rearwardly therefrom.

It will be understood that hanger 4, arms 6 and 7, link 15 and lever 16 are duplicated on the opposite side of the hopper and that operation of shaft 17 by the crank arm 18 transmits the necessary operating forces to both sides of the hopper door mechanism.

Obviously, various details of the construction may be varied without departing from the spirit of my invention and I contemplate the exclusive use of such modifications as come within the scope of my claims.

I claim:

1. In combination, a locomotive ash pan having a discharge opening, a door for closing said opening hinged on said pan to swing longitudinally of the locomotive, members comprising a toggle lock for said door, an operating shaft extending transversely of the locomotive, and means connecting said shaft to said members, said members and said shaft being mounted on said ash pan exclusively.

2. In combination, a locomotive ash pan provided with a discharge opening, a door for closing said opening hinged on said pan to swing longitudinally of the locomotive, members comprising a toggle lock for said door, an operating shaft extending transversely of the locomotive, an arm fixed to said operating shaft, and a link pivotally connected at one end to said arm and pivotally connected at the other end to said members, said members and said shaft being mounted on said ash pan exclusively.

3. In a locomotive, an ash pan provided with a discharge opening, a door for closing said opening hinged on said pan to swing longitudinally of the locomotive, members comprising a toggle lock for said door, an operating shaft extending transversely of the locomotive, a handle thereon, an arm fixed to said operating shaft, a link pivotally connected at one end to said arm and pivotally connected at the other end to said members, a locomotive frame, and a dog pivotally mounted on said frame for engaging said handle to hold said door in open position, said members and said shaft being mounted on said ash pan exclusively.

4. In a locomotive, an ash pan provided with a discharge opening, a door for closing said opening hinged on said pan to swing longitudinally of the locomotive, members comprising a toggle lock for said door, an operating shaft extending transversely of the locomotive, a handle thereon, an arm fixed to said operating shaft, a link pivotally connected at one end to said arm and pivotally connected at the other end to said members, a locomotive frame, a dog pivotally mounted on said frame for engaging said handle to hold said door in open position, and a hook-shaped element adapted to be inserted in a stationary element for holding said dog in position, said members and said shaft being mounted on said ash pan exclusively.

5. In combination, an ash pan hopper having a downwardly facing discharge opening, a door for said opening, hinged on said pan to swing longitudinally of the locomotive, a link pivoted to one end of said door and to said hopper, a toggle arm pivoted to the other end of said door and extending outwardly therefrom in a bow-like form, a cooperating toggle arm pivoted at one end to the other end of said first mentioned arm and extending inwardly therefrom and pivoted at its other end to the hopper structure, an operating shaft above said toggle arms and extending transversely of the locomotive, a crank on said shaft, and a link connecting said crank and the joint between said toggle arms, said shaft and toggle arms being mounted on the ash pan exclusively.

6. In combination, a locomotive ash pan hopper having a discharge opening, a door for said opening hinged on said pan to swing longitudinally of the locomotive, a toggle arm having an end pivoted to said door, another toggle arm having an end pivoted to said hopper, the other ends of said arms being pivoted to each other, at least one of said arms being adjustable in length, and means extending transversely of the locomotive operable from a higher point than said door for swinging said arms on their pivotal connections, said toggle arms and means being mounted on the ash pan exclusively.

7. In combination, locomotive side frames, an ash pan between and spaced from said side frames and having a discharge opening, a door for closing said opening, members comprising a toggle lock for said door and connected to said door immediately below the face thereof, an operating shaft, and means connecting said shaft to said members, said members and shaft being mounted on said ash pan exclusively.

8. In combination, locomotive side frames, an ash pan between and spaced from said side frames and provided with an inclined discharge opening, an inclined door for closing said opening, members comprising a toggle lock for said door and connected to said door above the lower end thereof, an operating shaft, an arm fixed to said operating shaft, and a link pivotally connected at one end to said arm and pivotally connected at the other end to said members, said members and shaft being mounted on said ash pan exclusively.

9. In a locomotive, an ash pan provided with a discharge opening, a door for closing said opening, members comprising a toggle lock for said door and connected to said door closely adjacent to the face thereof, an operating shaft, a handle thereon, an arm fixed to said operating shaft, a link pivotally connected at one end to said arm and pivotally connected at the other end to said members, said members and shaft being mounted on said ash pan exclusively, a locomotive frame, and a dog pivotally mounted on said frame for engaging said handle to hold said door in an open position.

In testimony whereof I hereunto affix my signature this 31st day of January, 1929.

STEPHEN J. RAETZ.